No. 678,167.　　　　　　　　　　　　　　　　　　Patented July 9, 1901.
A. G. DAVIS & W. B. POTTER.
MEANS FOR CONTROLLING ELECTRIC MOTORS.
(Application filed May 22, 1899.)
(No Model.)
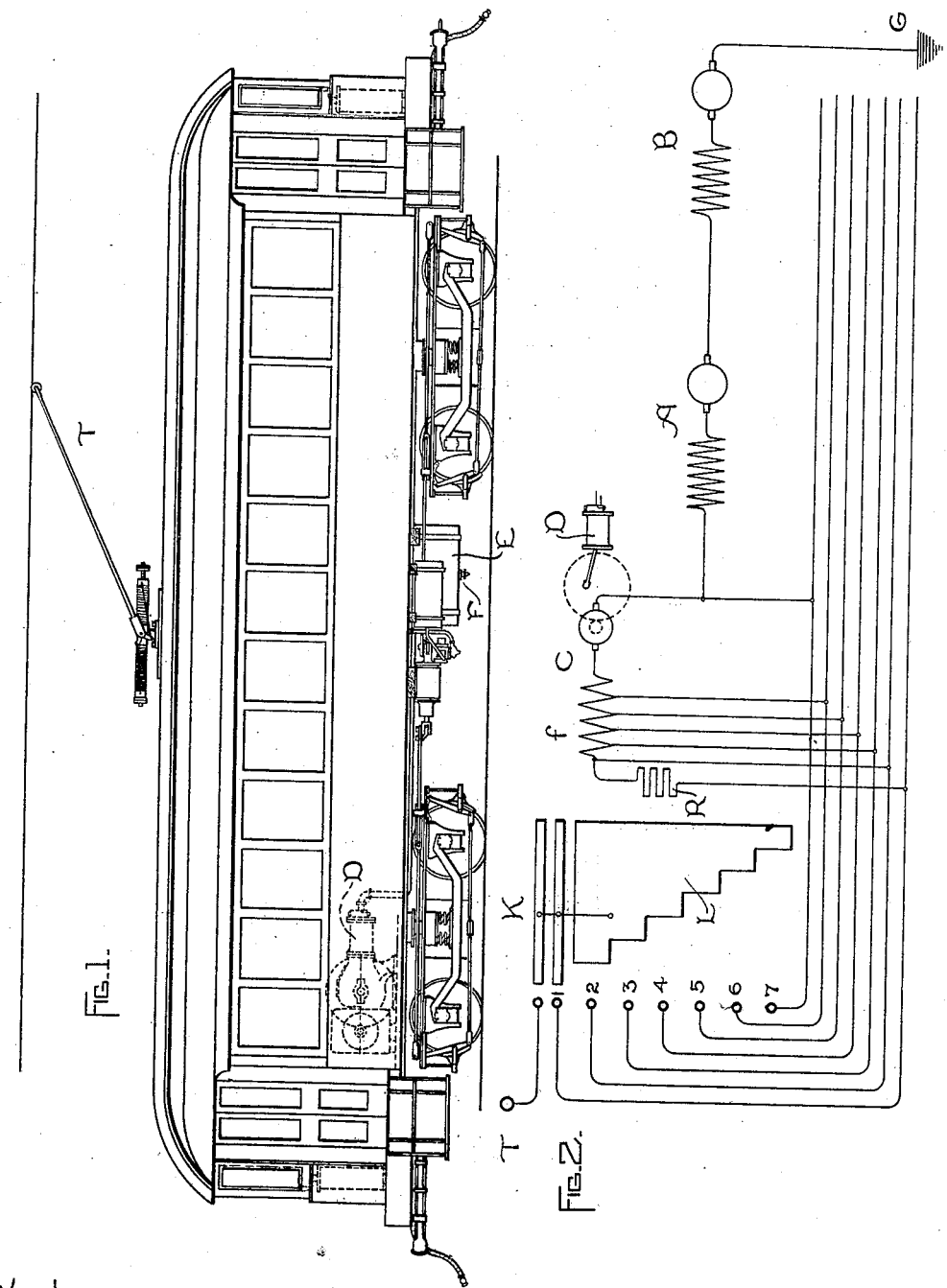
WITNESSES.
Edw. Williams Jr.
A. F. Macdonald.
INVENTORS.
William B. Potter,
Albert G. Davis,
by Albert G. Davis
Atty.

UNITED STATES PATENT OFFICE.

ALBERT G. DAVIS AND WILLIAM B. POTTER, OF SCHENECTADY, NEW YORK, ASSIGNORS TO THE GENERAL ELECTRIC COMPANY, OF NEW YORK.

MEANS FOR CONTROLLING ELECTRIC MOTORS.

SPECIFICATION forming part of Letters Patent No. 678,167, dated July 9, 1901.

Application filed May 22, 1899. Serial No. 717,863. (No model.)

*To all whom it may concern:*

Be it known that we, ALBERT G. DAVIS and WILLIAM B. POTTER, citizens of the United States, residing at Schenectady, county of Schenectady, and State of New York, have invented certain new and useful Improvements in Means for Controlling Electric Motors, (Case No. 792,) of which the following is a specification.

In cases where resistance is used for starting and controlling electric motors a considerable amount of energy is dissipated in the resistance in the form of heat. It is the aim of our present invention to prevent this waste of energy thus occasioned by substituting for the resistance, or at least for the greater part of it, a device which in operation gives rise to a counter electromotive force. This device may consist of an electric motor, and, as employed by us, the same is preferably connected to an air-compressor or other similar device in order to store the mechanical energy produced by the motor. Whatever be the form of counter-electromotive-force device employed we so arrange the same that the counter electromotive force may be varied at will, thus securing by the use of such a device the same advantages as are obtained by variation of resistance where resistance alone is employed.

The nature of our invention will be better understood by reference to the following description and accompanying drawings, while its scope will be indicated in the appended claims.

Figure 1 represents an electrically-operated vehicle embodying our invention, and Fig. 2 is a diagram of circuits.

In Fig. 2, A and B represent motors which are to be regulated. As shown, these motors are connected in series; but it is to be understood that suitable means may be provided for connecting them in parallel at will or for making any other desired connections between the same, the particular connections thus made being unimportant so far as our present invention is concerned. A starting resistance R, of comparatively small value, together with the regulating-motor C, are arranged so as to be connected in series with the motors A and B. Connections are brought from one end of the resistance R, from intermediate points in the field-winding $f$ of the motor C, and from one terminal of the motor A to contact-fingers 1 to 7, inclusive, on the controller K. These contact-fingers operate in conjunction with the contacts on the cylinder L of the controller K and, as will readily be seen from the drawings, are so arranged that in the first position of the controller the three motors A, B, and C, together with the resistance R, are all in series across the mains, which in this case are indicated, respectively, as the trolley T and a ground or track return G. At the next step of a controller the finger 2 makes contact with the cylinder L, thus short-circuiting the resistance R. As the controller is turned to its succeeding positions the sections of the field-winding $f$ are cut out successively, and at the last position (shown in Fig. 2) the armature of the motor C is cut out, thus leaving the motors A and B in series across the mains. Any desired connections may then be made between the motors A and B; but since such connections form no essential part of our present invention we have considered it unnecessary to illustrate the same.

We have shown the regulating-motor C as connected, preferably, to an air-compressor D. (Shown in dotted lines in Fig. 1 and diagrammatically in Fig. 2.) The air-compressor may be of any well-known type and is connected by suitable pipes to an air-reservoir, (indicated at E.) The pressure of air in this reservoir largely governs the speed at which the motor C operates when carrying current. If this fluid-pressure be allowed to continually increase during the operation of the motor C, the resistance opposed to the rotation of the motor will correspondingly increase, and if the amount of current passing through the motor be limited the speed of the motor will decrease until its torque becomes equal to the torque opposed thereto, when the motor will stop. Under these circumstances the function of the motor C as a counter-electromotive-force device disappears. For this reason we prefer to provide the reservoir E with a blow-off valve which is similar in construction to an ordinary safety-valve and is conventionally indicated at F. So long as the current supplied to the motor C is sufficient to set up torque of a value great enough to cause the air-compressor to force air into its reservoir the motor will continue to run and to oppose its counter electromotive force to the current supplied thereto.

When the motors A and B are first connected in circuit through the motor C and resistance R across the mains, there is an instantaneous rush of current, which, however, is limited in value by the resistance R and the combined resistance of the motors A, B, and C. This large flow of current causes the regulating-motor C to start up instantly and rapidly accelerate in speed, the quick acceleration being due to a considerable extent to the low pressure upon the air-compressor piston at starting. The rapid rotation of the armature of the motor C sets up a counter electromotive force, which cuts down the current supplied from the mains. After the motor C has, however, been in operation for a short time the pressure in the reservoir E rises sufficiently to open the relief-valve, after which the motor C works against a constant torque, thus eliminating the tendency to an indefinite increase in load, such as would bring the motor to a stop and deprive it of its function as a regulator.

We preferably utilize the compressed air for operating the air-brakes, and since the air-brakes are nearly always used in lowering the speed and in bringing the motor to a stop it follows that the air-compressor when next started up works against the reduced pressure in the reservoir occasioned by the previous use of the brakes.

The motors A and B work against a maximum torque during the time of starting when they are overcoming the inertia of the car. As their speed rises, however, the motors work against a constantly-decreasing torque; but at the same time their counter electromotive force increases. The point is soon reached, therefore, when the counter electromotive force of the motors A and B and of the regulating-motor C taken together are enough to cut down the current flowing to an amount sufficient to just supply the frictional and other losses in propelling the vehicle. The motors then run at a constant speed. If a further increase in speed is desired, it may be obtained in the apparatus illustrated in the drawings by cutting out first the resistance R and then step by step the turns of the field-winding of the regulating-motor C. The elimination of the resistance increases the speed of the motors A and B in obvious manner, while the decrease in the amount of effective field-winding of the motor C decreases its counter electromotive force and in a similar manner operates to supply additional energy to the motors A and B. Simultaneously with cutting out the last section of the field of the motor C we find it desirable to cut out the armature as well, thus leaving the motors A and B alone in circuit.

The feature of preventing an indefinite increase in the torque opposing the rotation of the regulating-motor we consider of considerable value, since it allows the motor to be kept in circuit indefinitely and to act as a regulator during the whole time it is in circuit.

What we claim as new, and desire to secure by Letters Patent of the United States, is—

1. The combination of a vehicle, a fluid-compressor thereon, a driving motor or motors geared to wheels of said vehicle, and a motor connected to said fluid-compressor and arranged in circuit with said driving motor or motors.

2. The combination of two independently-rotatable electric motors connected in series, an energy-storing device operated by one of the motors, and means for varying the amount of effective field-winding of one of said motors.

3. The combination of a motor to be regulated, a regulating-motor, an air-compressor driven by the regulating-motor, and means for varying at will the speed of said regulating-motor.

4. The combination of a motor to be regulated, a regulating-motor, an air-compressor driven by the regulating-motor, and means for varying at will the strength of field of said regulating-motor.

5. The combination of a translating device to be regulated, a regulating-motor in series therewith, means for storing the energy of said motor in the form of fluid-pressure and means for varying at will the rate at which the energy is stored.

6. The combination of a translating device to be regulated, a regulating-motor in series therewith, means for storing the energy of said motor in a form recoverable at will, and means for varying at will the rate at which the energy is stored.

7. The combination of a translating device to be regulated, a regulating-motor in series therewith, means for storing the energy of said motor in a form recoverable at will, and means for varying the amount of effective field-winding of said motor.

8. The combination of a translating device to be regulated, a regulating-motor, an air-compressor driven by the motor, and means for varying the amount of effective field-winding of said motor.

9. The combination of a translating device to be regulated, a counter-electromotive-force device, an air-compressor driven by energy derived from the counter-electromotive-force device, and means for varying at will the counter electromotive force of said device.

10. The combination of motors, a load for one of the motors such that the resistance to rotation of the motor is greatest when starting, and a load for another of said motors such that the resistance to rotation of the last-mentioned motor is least when starting and increases automatically to a predetermined maximum.

11. The combination of a plurality of motors connected in circuit with each other, a load for one of the motors such that its resistance to rotation is greatest when starting, and a load for another of said motors such that the resistance to rotation of the last-mentioned motor is least when starting and increases automatically to a constant value.

In witness whereof we have hereunto set our hands this 16th day of May, 1899.

ALBERT G. DAVIS.
WILLIAM B. POTTER.

Witnesses:
BENJAMIN B. HULL,
MABEL E. JACOBSON.